Patented Nov. 5, 1940

2,220,308

UNITED STATES PATENT OFFICE 2,220,308

GENERATOR COOLER

Gerald D. Whitman, Tajique, N. Mex., assignor of one-half to Frank Robert Dow, Tajique, N. Mex.

Application July 28, 1939, Serial No. 287,169

2 Claims. (Cl. 123—198)

This invention relates to means for cooling a generator of an internal combustion motor, the general object of the invention being to provide means for drawing air through the generator by the suction created in the carburetor of the motor, with means for regulating the flow of air and also to prevent back-fire from reaching the generator of the filter means forming part of the invention.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which.

Figure 1:
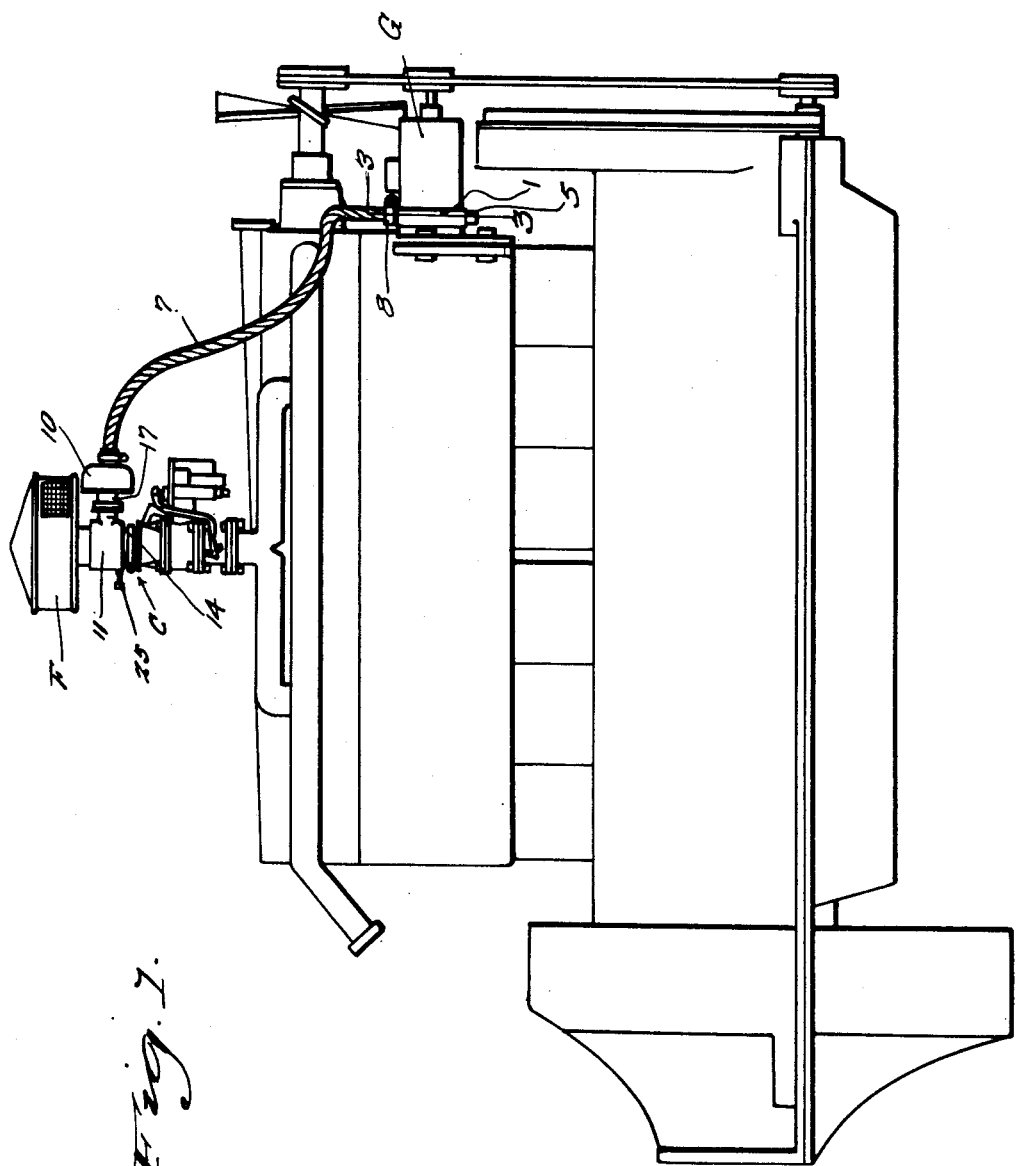
Figure 1 is a side view showing an internal combustion motor provided with the invention.

In carrying out the invention I provide a clamping ring or band 1 for one end of the generator G, the band being of split construction and held around the generator by the screw 2 passing through the bent ends 3 of the band, this band forming a small air space 4 between itself and that part of the generator which it surrounds. The band is provided with an inlet nipple 5 at the bottom for the admission of air and it is also formed with a split outlet nipple 6 for receiving the end of a flexible tube 7, the tube being held in place by a clamping member 8. The other end of the tube 7 extends into a tubular part or nipple 9 formed on a filter casing 10. Between the carburetor C and the air filter F of the carburetor a small casing 11 is located, the casing being provided with the nipples 12 at its ends for receiving the tubular part leading from the filter and to the carburetor. An opening 13 is formed in the side part of the casing 11 and a tubular part 14 surrounds the opening and is suitably fastened to the casing 11 and said tubular part 14 is carried by a cover plate 15 which is detachably connected by the screws 16 to a small casing 17 surrounding an opening 18 in the cover part 19 of the filter casing 10, the small casing 17 being suitably connected with this cover part 19. An inclined partition 20 is placed in the casing 11 and slopes downwardly from that side of the casing 11 having a hole 13 therein to the opposite side and said partition has a hole 21 therein for the passage of the filtered air from the filter F to the carburetor. A downwardly closing flat valve 22 controls the opening 21 and is hinged as at 23 to the top of the partion 20 adjacent the lower edge thereof and said valve plate has a downwardly inclined strip 24 attached thereto which passes through the hole 21 and is engaged by the inner end of a set screw 25 which passes through a threaded hole in the casing 11 and is held in adjusted position by a lock nut 26. This screw with the strip 24 acts as a stop for limting downward movement of the valve 22 and, of course, by adjusting the screw downward movement of the valve can be adjusted.

Figure 2:
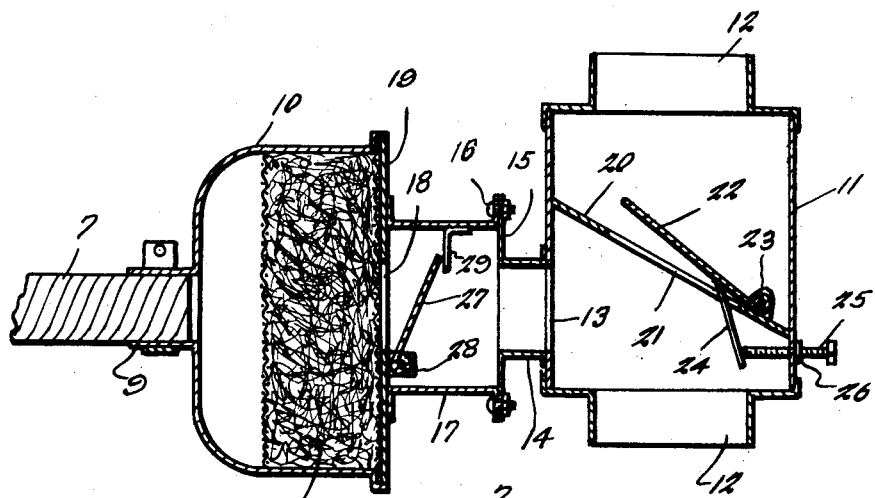
Figure 2 is a vertical sectional view through the major portion of the invention.
Figure 3:
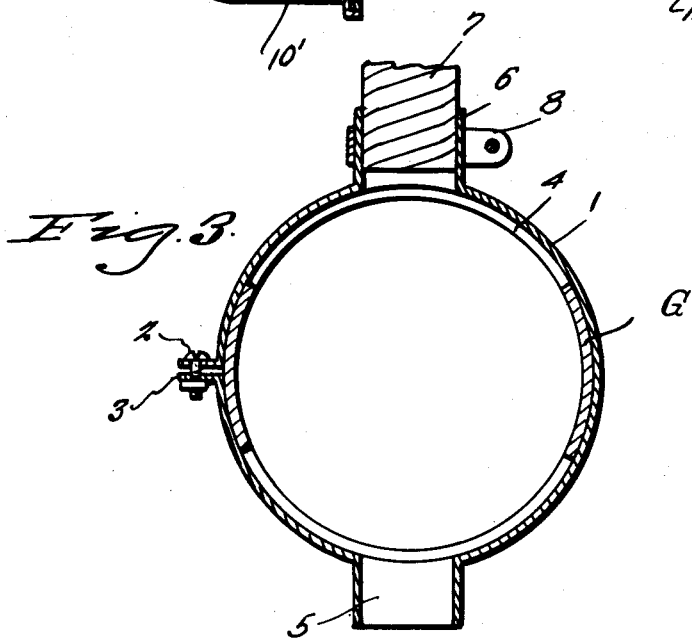
Figure 3 is a section on the line 3—3 of Figure 1.

A flat valve 27 is hinged at its lower edge as at 28 to the cover member 19 under the opening 18 therein and a depending stop member 29 limits opening movement of the valve 27 to the position shown in Figure 2.

Thus it will be seen that when the motor is in operation the flow of air from the filter F to the carburetor C due to the suction created by the moving piston of the engine will be checked by the valve 22 so that the suction is created in the casing 17 attached thereto so that air will be drawn through the nipple 5 and this will flow around the interior parts of the generator G and then this air will pass into the tube 17 then into the casing 10, through the filtering material 10' in said casing and then through the opening 18 into the casing 17, the valve 27 being in the open position shown in Figure 2, and then the air will pass through the member 14 and hole 13 into the lower part of the casing 11 and then through the carburetor. As before stated by adjusting the valve 22 the suction created in the parts connecting the casing 11 to the generator can be controlled or regulated and if a back-fire should occur the force of the back-fire will close the valve 27 and open the valve 22 so that none of the parts of the invention will be injured by the back-fire.

The member 1 is placed around the open or brush end of the generator and the invention will not only act to cool the generator but it also tends to remove small particles of metal created by wear of the parts of the generator and other foreign matter will be drawn from the generator but this material is kept from entering the carburetor and therefore the engine by the filtering material 10' placed in the casing 10.

It will be seen that the faster the generator revolves, the cooling device will force more cold air through the generator due to the higher speed of the engine so that the generator is kept at a constant temperature regardless of the speed. Also the air passing through the generator is heated and this heated air is introduced in the carburetor which will add to the efficiency of the engine. Thus the device operates to the mutual benefit of both the carburetor and the generator.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. An internal combustion motor including a generator and a carburetor, an air filter for the carburetor, a casing located between the filter and carburetor, an upwardly opening valve in said casing, means for regulating the downward movement of the valve to regulate the amount of air which passes from the filter through the casing to the carburetor, a second casing connected with the first-mentioned casing below the valve, a filter casing connected with the second casing, a casing surrounding a part of the generator and having an air inlet opening and a conduit connecting the last-mentioned casing with the filter casing.

2. An internal combustion motor including a generator and a carburetor, an air filter for the carburetor, a casing located between the filter and carburetor, an upwardly opening valve in said casing, means for regulating the downward movement of the valve to regulate the amount of air which passes from the filter through the casing to the carburetor, a second casing connected with the first-mentioned casing below the valve, a filter casing connected with the second casing, a casing surrounding a part of the generator and having an air inlet opening and a conduit connecting the last-mentioned casing with the filter casing, and a normally open valve controlling communication between the filter casing and the second casing, said valve closing if a back-fire occurs in the first casing and the first valve opening if such back-fire occurs.

GERALD D. WHITMAN.